US009751639B2

(12) United States Patent
Dvorak et al.

(10) Patent No.: US 9,751,639 B2
(45) Date of Patent: Sep. 5, 2017

(54) SYSTEM TO CONTROL CAMERA TRIGGERING AND VISUALIZE AERIAL IMAGING MISSIONS

(71) Applicant: Field of View LLC, Grand Forks, ND (US)

(72) Inventors: David Robert Dvorak, Grand Forks, ND (US); Daniel Joseph Hajicek, Los Altos, CA (US)

(73) Assignee: Field of View LLC, Grand Forks, ND (US)

( * ) Notice: Subject to any disclaimer, the term of this patent is extended or adjusted under 35 U.S.C. 154(b) by 260 days.

(21) Appl. No.: 14/558,711

(22) Filed: Dec. 2, 2014

(65) Prior Publication Data

US 2016/0286175 A1    Sep. 29, 2016

Related U.S. Application Data

(60) Provisional application No. 61/910,956, filed on Dec. 2, 2013.

(51) Int. Cl.
| | | |
|---|---|---|
| H04N 7/18 | (2006.01) | |
| G01S 19/47 | (2010.01) | |
| B64C 39/02 | (2006.01) | |
| B64D 47/08 | (2006.01) | |
| G01S 19/14 | (2010.01) | |

(52) U.S. Cl.
CPC ............ B64D 47/08 (2013.01); G01S 19/14 (2013.01); *B64C 39/024* (2013.01); *B64C 2201/123* (2013.01); *G01S 19/47* (2013.01)

(58) Field of Classification Search
None
See application file for complete search history.

(56) References Cited

U.S. PATENT DOCUMENTS

| | | | |
|---|---|---|---|
| 5,894,323 A | * | 4/1999 | Kain ...................... G01C 11/02 348/116 |
| 7,725,528 B1 | | 5/2010 | Zink et al. |

(Continued)

FOREIGN PATENT DOCUMENTS

IL    WO 2015/049675 A1 * 9/2016 ............. G01S 19/48

OTHER PUBLICATIONS

Jarrell et al., "Aircraft Attitude, Position and Velocity Determination Using Sensor Fusion", AIAA Guidance, Navigation and Control Conf. and Exhibit, Aug. 18-21, 2008, pp. 1-17.*

*Primary Examiner* — Reza Aghevli
(74) *Attorney, Agent, or Firm* — Florent Martel

(57) ABSTRACT

A camera triggering and aerial imaging mission visualization system. More specifically, a system that controls camera triggering, manages data from a positioning system and an attitude measuring device, and provides real-time image coverage and mission visualization in manned and unmanned aerial imaging applications. The system includes a control and data management device that interfaces with at least one camera; one or more positioning systems; one or more attitude measuring devices; one or more data transmission devices; and a mission visualization system. The aerial imaging system may be interfaced with a variety of commercial, off-the-shelf or custom cameras for use in aerial imaging on manned and unmanned aircrafts, and may also be used on other types of vehicles or for other applications.

7 Claims, 8 Drawing Sheets

(56) References Cited

U.S. PATENT DOCUMENTS

| | | | |
|---|---|---|---|
| 8,902,308 B2* | 12/2014 | Rinner | G06T 7/0028 |
| | | | 348/117 |
| 2003/0234862 A1* | 12/2003 | Andersen | B64D 47/08 |
| | | | 348/144 |
| 2004/0257441 A1 | 12/2004 | Pevear et al. | |
| 2011/0064312 A1* | 3/2011 | Janky | G01C 15/00 |
| | | | 382/195 |
| 2013/0012242 A1* | 1/2013 | Nag | H04W 4/185 |
| | | | 455/457 |
| 2014/0059166 A1* | 2/2014 | Mann | H04L 65/60 |
| | | | 709/217 |
| 2014/0098229 A1* | 4/2014 | Lu | H04N 7/181 |
| | | | 348/148 |
| 2014/0146173 A1* | 5/2014 | Joyce | G01C 11/04 |
| | | | 348/144 |
| 2015/0022656 A1* | 1/2015 | Carr | G06K 9/0063 |
| | | | 348/117 |

* cited by examiner

SYSTEM TO CONTROL CAMERA TRIGGERING AND VISUALIZE AERIAL IMAGING MISSIONS

CROSS-REFERENCE TO RELATED APPLICATION

This application claims the benefit of U.S. Provisional Application No. 61/910,956, filed Dec. 2, 2013, titled SYSTEM TO CONTROL CAMERA TRIGGERING AND VISUALIZE AERIAL IMAGING MISSIONS IN REAL-TIME.

FIELD OF THE DISCLOSURE

The disclosed invention relates to real-time aerial imaging mission visualization. More specifically, this invention relates to a system that controls camera triggering, manages data from a positioning system and an attitude measuring device, and provides real-time image coverage and mission visualization in manned and unmanned aerial imaging applications.

BACKGROUND OF THE INVENTION

Aerial imagery is a valuable tool in many industries. It can be useful in precision agriculture practices, mapping, surveillance, monitoring, etc. Satellite imagery can be used for these purposes, but aerial imagery taken from a manned or unmanned aircraft provides the benefits of higher-resolution, on-demand imagery. However, manned and unmanned aircraft both operate at much lower altitudes than satellites and cannot capture as large of an area in one image. This necessitates a map of the area of interest created from several images that have been stitched together into a mosaic. To make a complete, high-quality mosaic, it is vital that the images cover the full area of interest with sufficient overlap. The amount of image overlap and coverage over the area of interest can be difficult to ensure, especially during a mission. Lack of sufficient coverage typically is not recognized until after an attempt to process the imagery into a mosaic, a lengthy process that, depending on the resolution and number of images, can take many hours. If lack of coverage, non-sufficient overlap, or a bad image is discovered, the operator has to re-do the mission to collect the required imagery. This mission can be delayed due to weather or other considerations, or it can interfere with the scheduling of the operator's other missions. All of this postpones the delivery of the product and drives up data acquisition costs.

To determine the portions of the Earth's surface that are depicted in captured aerial images, it is necessary to georeference the captured images. Traditional methods of georeferencing involve matching ground control points from a base map with corresponding features found in the captured images. This method can be time consuming and may be impossible if there are no readily identifiable ground control points in the images. However, if geographic position and attitude of the camera at the time of image capture can be accurately associated with each captured image, direct georeferencing methods can be used to give the images geographic context in an automated fashion.

Current imaging systems may include various features, but are incapable of interfacing with a variety of cameras, do not allow for cameras to be triggered based on parameters other than a fixed time interval, do not provide an operators with the ability to visualize the mission in real-time to manage and verify the coverage and image overlap of their aerial imaging missions, and some have large and heavy components that limit the type of vehicles into which the system can be integrated.

There is need of a small, lightweight, integrated system that readily interfaces with a variety of cameras to intelligently control camera triggering, verify image capture, accurately associate images with geographic position data and attitude data representative of the camera at the time of image capture, perform direct georeferencing calculations for each captured image, and display a visualization of the mission and captured images over the area of interest in real-time. This visualization allows the user to verify that sufficient image coverage of the area of interest and overlap between captured images is accomplished during the imaging mission as well as provide a preview of the captured images over the area of interest. The ability to see image coverage and captured images during a mission makes imaging missions easier, more efficient, and less stressful for operators and allows them to immediately adapt for poorly tracked or inappropriately planned flight lines, maximizing the number of successful missions that they can perform in a day. Operators are also able to act on any information gleaned from the captured images while they are still at the field.

SUMMARY OF THE INVENTION

The disclosed aerial imaging system can generate image-associated geographic position and attitude data, and transfer this data, as well as captured images, to a mission visualization system that performs direct georeferencing calculations and presents a real-time visualization of the mission and captured images over the area of interest. The system includes a control and data management device that interfaces with at least one camera, a positioning system, an attitude measuring device, a data transmission device, and a mission visualization system.

The control and data management device can interface with a camera to trigger the camera and confirm that, and determine precisely when, an image was captured. The control and data management device can be configured to trigger the camera based on a time interval, distance interval, overlap interval, as fast-as-possible, at waypoint arrival, or when a signal is received from an external source, such as an autopilot or a wired or wireless remote. The control and data management device can interface with a positioning system and with an attitude measuring device to request the geographic position and attitude of the camera. The control and data management device can transfer image-associated geographic position and attitude data, as well as the captured images, via a data transmission device to the mission visualization system whenever the control and data management device receives image capture confirmation. The control and data management device can also use the data transmission device to transfer the geographic position data and attitude data to the mission visualization system at a set time interval to visualize the flight path travelled in two or three dimensions.

The mission visualization system can perform direct georeferencing calculations to project the captured image's footprint or the captured image onto a virtual representation of Earth's surface using the image-associated geographic position and attitude data provided by the control and data management device. The visualization can be displayed in real-time over a virtual representation of Earth's surface to allow the operator of a manned or unmanned aircraft to confirm, during a mission, that full coverage of an area of interest is being captured and to have a preview of the area of interest.

A feature of the present invention is its ability to readily interface with a variety of cameras with minimal or no modification to the camera or the disclosed system. Another feature of this system is that the attitude measuring device, if included in the system, is rigidly mounted relative to the camera(s) to minimize offset variability of the camera(s) relative to the attitude measuring device.

DETAILED DESCRIPTION

Figure 1:
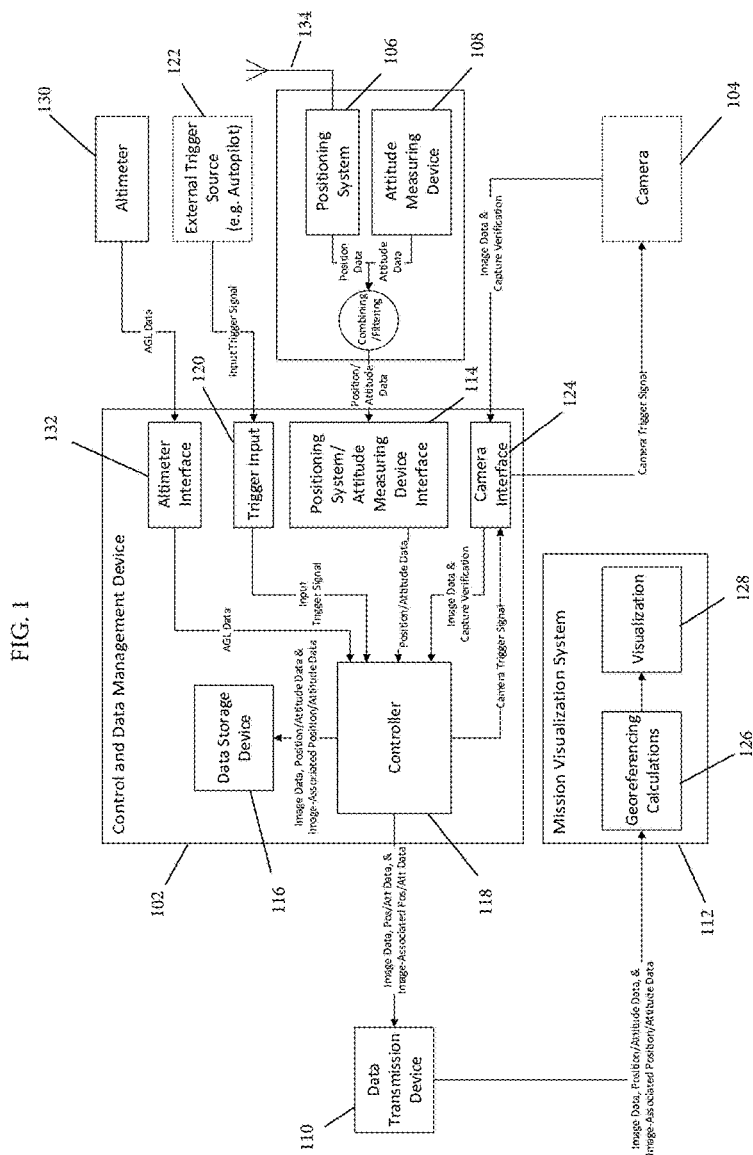
FIG. 1 is a schematic block diagram depicting one embodiment of the disclosed system.
Figure 2:
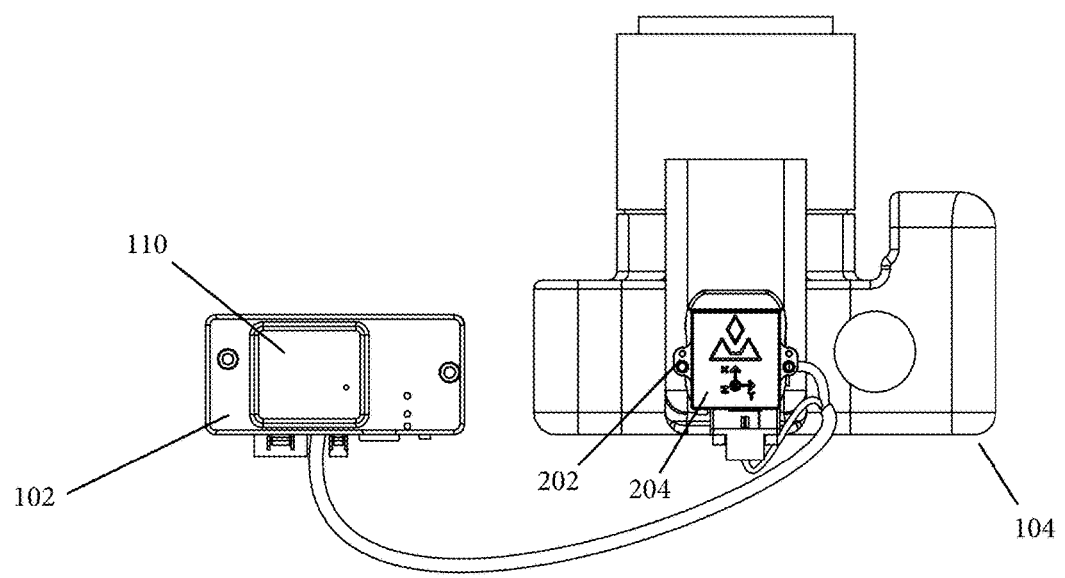
FIG. 2 is a top down view of some of the components of one embodiment of the disclosed invention.
Figure 3:
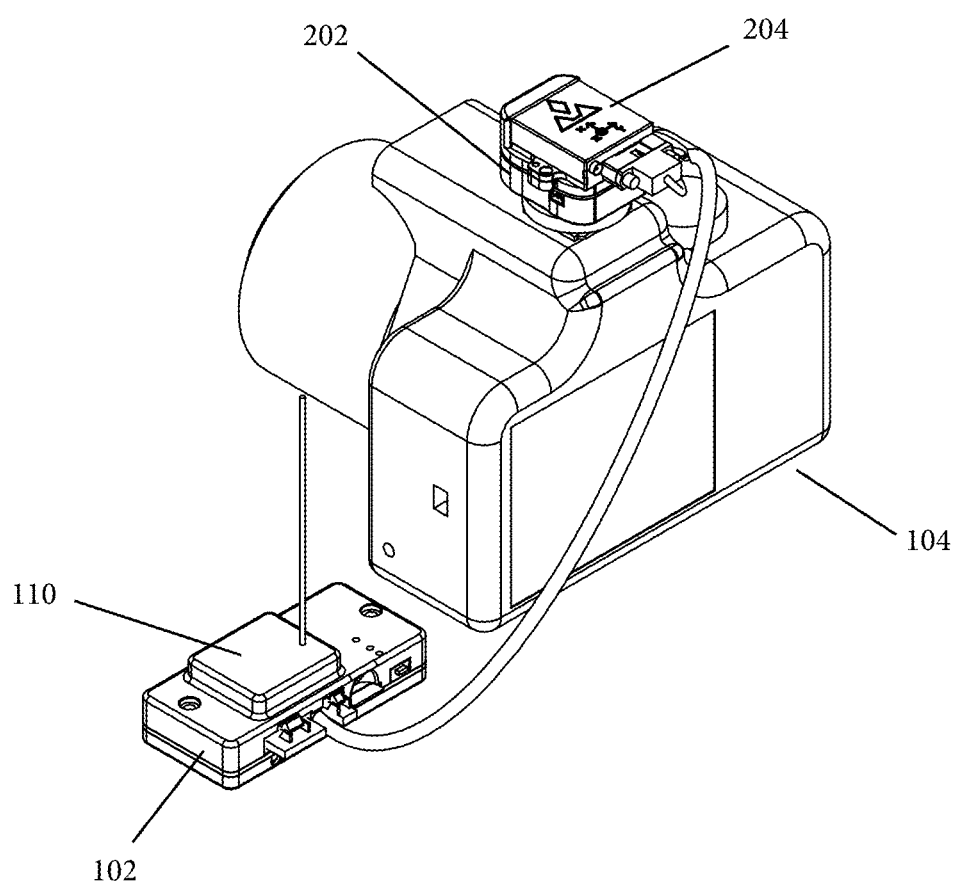
FIG. 3 is a perspective view of some of the components of one embodiment of the disclosed invention.
Figure 4:
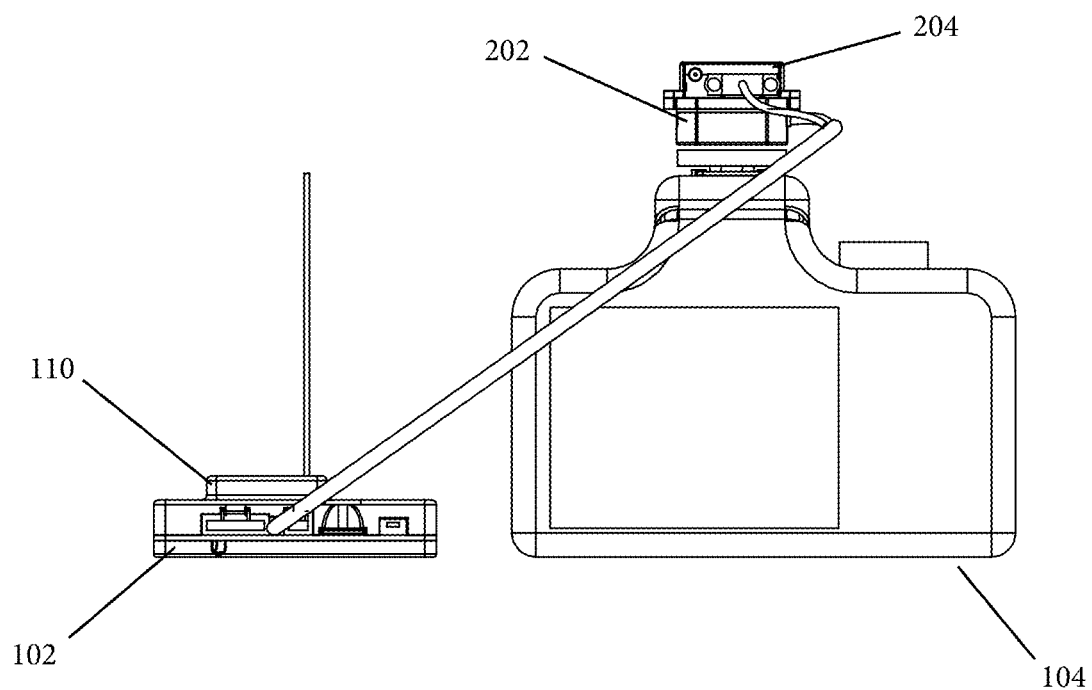
FIG. 4 is a back view of some of the components of one embodiment of the disclosed invention.
Figure 5:
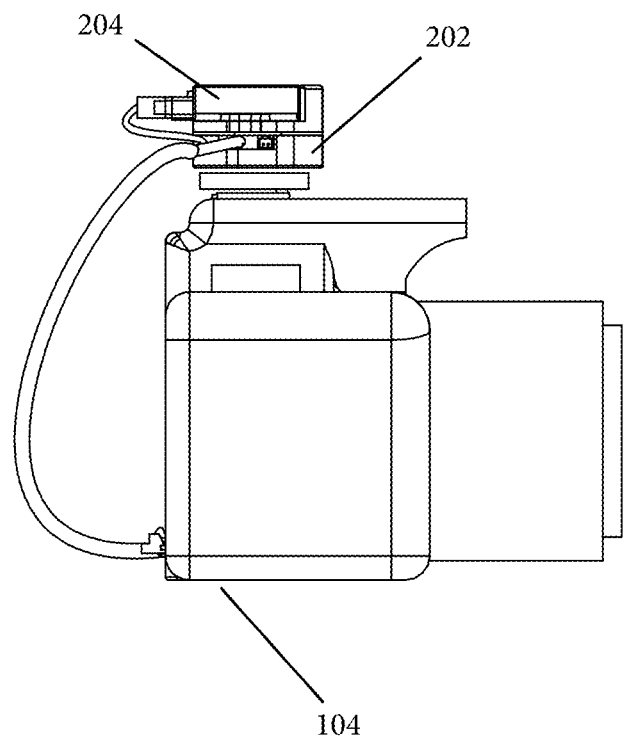
FIG. 5 is a side view of some of the components of one embodiment of the disclosed invention.

Various embodiments will be described in detail with reference to the drawings, wherein like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims. It is understood that various omissions and substitutions of equivalents are contemplated as circumstances may suggest or render expedient, but these are intended to cover application or embodiments without departing from the spirit or scope of the claims attached hereto. Also, it is to be understood that the phraseology and terminology used herein are for the purpose of description and should not be regarded as limiting.

Figure 7:
FIG. 7 is a view of one embodiment of the real-time visualization generated by the mission visualization system showing the captured image footprints populated with undistorted and compressed captured images, the flight line, the image capture locations, a rendering of the camera's current geographic position and attitude, and a rendering of the camera's current field of view.

In a preferred embodiment, as illustrated in FIG. 1, the disclosed aerial imaging system includes: a control and data management device 102 interfaced with at least one camera 104; one or more positioning systems 106; one or more attitude measuring devices 108; a positioning system and/or attitude measuring device interface 114; one or more data transmission devices 110; and a mission visualization system 112. The aerial imaging system may be interfaced with a variety of commercial, off-the-shelf or custom cameras 104 for use in aerial imaging on manned or unmanned aircraft, but may also be used on other types of vehicles or for other applications. The system can be used with the variety of cameras 104 with minimal or no modification to the camera 104 or to the system. The control and data management device 102 can control the triggering of the camera 104 as well as the transfer and storage of image-associated geographic position and attitude data. In some embodiments, the control and data management device 102 can also control the transfer and storage of captured images. The mission visualization system 112 can use the image-associated geographic position and image-associated attitude data to perform direct georeferencing calculations 126 and can further display on screen a visualization 128 of the mission such as, but not limited to, the flight path on a virtual two or three dimensional representation of Earth's surface in real-time, image capture locations, and results from the georeferencing calculations, such as, but not limited to, a representation of the captured images, or the actual captured images, as illustrated in FIG. 7.

Control and Data Management Device

In some embodiments, the control and data management device 102 can include: a controller 118 that runs a software program; a data storage device 116; and input and output interfaces 114, 120, 124, and 132. The control and data management device 102 may also include human interfaces and power regulation.

The controller 118 runs the software program that can command a camera 104 to capture an image, retrieve the captured image, collect geographic position data and attitude data, and manage data. The controller 118 can trigger a camera 104 to capture a still image or grab a frame from a video stream. Frame grabbing can be managed by the control and data management device 102 or by an external device that is interfaced with the control and data management device 102. The controller and software program can manage data by performing the following tasks: detecting if the camera 104 captured an image and, if so, when it captured the image; retrieving the captured image and image metadata from the camera 104; collecting geographic position data from the positioning system 106 and/or attitude data from the attitude measuring device 108; associating each captured image with the geographic position data and/or attitude data collected at the moment the image was captured; storing the image-associated geographic position and/or image-associated attitude data, the captured image, and the geographic position data and/or attitude data captured at a set time interval, (such as at 25 Hz), to the data storage device 116; and sending the data to the data transmission device 110. The controller 118 can also query the data storage device 116, the positioning system 106, and/or the attitude measuring device 108 during the initialization of the control and data management device 102 to establish whether the data storage device 116, the positioning system 106, and/or the attitude measuring device 108 are properly initialized. The controller 118 may also query the positioning system 106 and/or the attitude measuring device 108 to check for correct configuration and to reconfigure the positioning system 106 or the attitude measuring device 108, if necessary.

The data storage device 116 can be used to store the image-associated geographic position data, the image-associated attitude data, and the captured images, as well as store the geographic position data and attitude data throughout the mission at a set time interval. The data storage device 116 can also contain a configuration file referenced by the controller 118, enabling configuration changes without requiring modifications to the software program that is run on the controller 118.

Various input and output interfaces can enable the control and data management device 102 to communicate with and control the camera 104, the positioning system 106, the attitude measuring device 108, and the data transmission device 110. The various input and output interfaces can optionally include an input trigger signal interface 120 to enable triggering from an external source 122. The control and data management device 102 can interface with the camera 104 via a camera interface 124 to trigger the camera 104 and confirm that an image was captured, to request the image metadata (such as image name, date of capture, time of capture, and camera information), to request the captured image, and/or to provide power to the camera 104. The control and data management device 102 can interface with the data transmission device 110, which can be a data transmitter or data transceiver, to transfer to the mission visualization system 112 any of the image-associated geographic position data and image-associated attitude data, the captured images, and the geographic position data and attitude data captured at a set time interval.

In some embodiments, the control and data management device 102 can be configured to trigger the camera 104 based on a variety of methods. Triggering may be performed at a set time interval, a set distance interval, an overlap interval, as fast-as-possible, or at waypoint arrival. Time interval triggering can be accomplished by triggering the camera 104 at discrete time intervals that are calculated by the controller 118. Distance interval triggering can be accomplished by triggering the camera 104 at discrete distance intervals that are calculated by the controller 118 using geographic position data from the positioning system 106 and a model of the Earth. Overlap interval triggering can be accomplished by triggering the camera 104 such that a specified percent image overlap is accomplished as calculated by the controller 118, using geographic position data from the positioning system 106, the angular field of view of the camera 104 along the direction of travel, above ground level altitude (AGL), and optionally attitude data. Fast-as-possible triggering can be accomplished by triggering the camera 104 whenever the controller 118 detects that the camera 104 is not signaling that a previously commanded image capture sequence is currently being performed. Waypoint arrival triggering can be accomplished by triggering image capture when the controller 118 determines, using geographic position data from the positioning system 106, that the camera 104 comes within a specified boundary around a predefined waypoint. An input signal from an external source 122, such as an autopilot or an input signal from a wired or wireless remote, can also be sent to the controller 118 via the trigger input signal interface 120 to trigger a single event or start and stop triggering sequences. The triggering can be limited by, or based on, altitude, attitude, a boundary of an area, user-specified geographic position, or relative position. The control and data management device 102 can trigger image capture by sending a discrete signal to the camera 104, sending a serial command to the camera 104, closing contacts on a circuit within the camera 104, or sending pulses of visible or non-visible light or a radio signal to the camera 104. The control and data management device 102 can also interface with the camera 104 via the camera interface to confirm that the camera 104 captured an image. This confirmation can be acquired through a variety of methods including, but not limited to, detecting the state of contacts in the hotshoe, detecting a signal sent by the camera 104 through a dedicated image capture indication output, optically reading indication LED signals, or detecting sound waves. Capture verification can also be determined through digital, analog, or wireless communication with the camera 104.

Each time the control and data management device 102 receives confirmation from the camera 104 that an image has been captured, the control and data management device 102 can associate a geographic position data string and attitude data string with the captured image and transfer and store the image-associated geographic position data and image-associated attitude data. The geographic position data and attitude data string that is associated with the captured image can be the latest string that has entered the system when image capture confirmation is received. It can also be a string from before or after the point when the capture confirmation is received or data interpolated from multiple strings.

The control and data management device 102 can retrieve captured images from the camera 104 by means of a wired or wireless connection to the camera over which captured images are transferred. In one embodiment, the control and data management device 102 has a Wi-Fi module dedicated to communicating with a Wi-Fi enabled camera 104 to request that a captured image be transferred from the camera's internal memory to the control and data management device 102 where it may be processed, transferred to the mission visualization system 112, and/or stored on the data storage device 116. In such an embodiment, the control and data management device 102 can also communicate with the camera 104 to control and change the camera settings.

The control and data management device 102 may include human interfaces and power regulation. Human interfaces may include switches to control triggering or data logging, or Light Emitting Diodes (LEDs) or a display screen to show the status of the device. A power regulation system or systems may take electrical power and regulate voltage and limit amperage to a level or levels appropriate for the electrical components in the control and data management device 102 as well as the devices with which the control and data management device 102 interfaces.

In one embodiment of the invention, the control and data management device 102 can calculate the system's above ground level altitude (AGL) using the geographic position data and a digital elevation model (DEM) stored onboard the data storage device 116. In another embodiment, the system's AGL can be measured using a radar or laser altimeter 130 that interfaces with the control and data management device 102 via an altimeter interface 132. The control and data management device 102 may use the AGL estimate, the interior orientation parameters of the camera 104, and the image-associated geographic position data and image-associated attitude data to perform direct georeferencing calculations 126.

Positioning System and Attitude Measuring Device

In some embodiments, the control and data management device 102 can interface with a positioning system 106, such as a GPS receiver, to estimate the geographic position of the camera 104, and can interface with an attitude measuring device 108, such as an inertial measurement unit (IMU), to estimate the attitude of the camera 104. The positioning system 106 and attitude measuring device 108 may also take the form of an inclusive device 204 that outputs pre-combined and filtered (e.g. Kalman filtered) geographic position data and attitude data. Alternatively, the control and data management device 102 can interface with an external source of geographic position data and attitude data, such as an autopilot, to enable the retrieval of geographic position data and attitude data. The control and data management device 102 can also interface with the positioning system 106 and attitude measuring device 108 to provide power, if necessary. The attitude measuring device 108 can be rigidly mounted relative to the camera 104 to measure the attitude of the camera 104 and to minimize offset variability of the camera 104 relative to the attitude measuring device 108. The positioning system 106 can include a receiver that receives signals from satellites using an internal or remote antenna 134, such as a GPS antenna, that can be mounted on the interior or exterior of the vehicle.

Data Transmission Device

In some embodiments, the data transmission device 110 can receive the image-associated geographic position data and image-associated attitude data and the captured image, as well as the stream of geographic position data and attitude data that is captured at a set time interval, from the control and data management device 102 and then transfer the data to the mission visualization system 112. The data transmission device 110 can also provide a means of changing the configuration settings of the control and data management device 102 via the mission visualization system 112. In some embodiments, the data transmission device 110 is a device capable of wireless connection using a Wi-Fi module, a Bluetooth module, cellular network module, or other wireless communication device. Alternatively, the data transmission device 110 can have an interface capable of direct communication with the mission visualization system 112 using a wired or fiber optic connection.

Mission Visualization System

Figure 6:
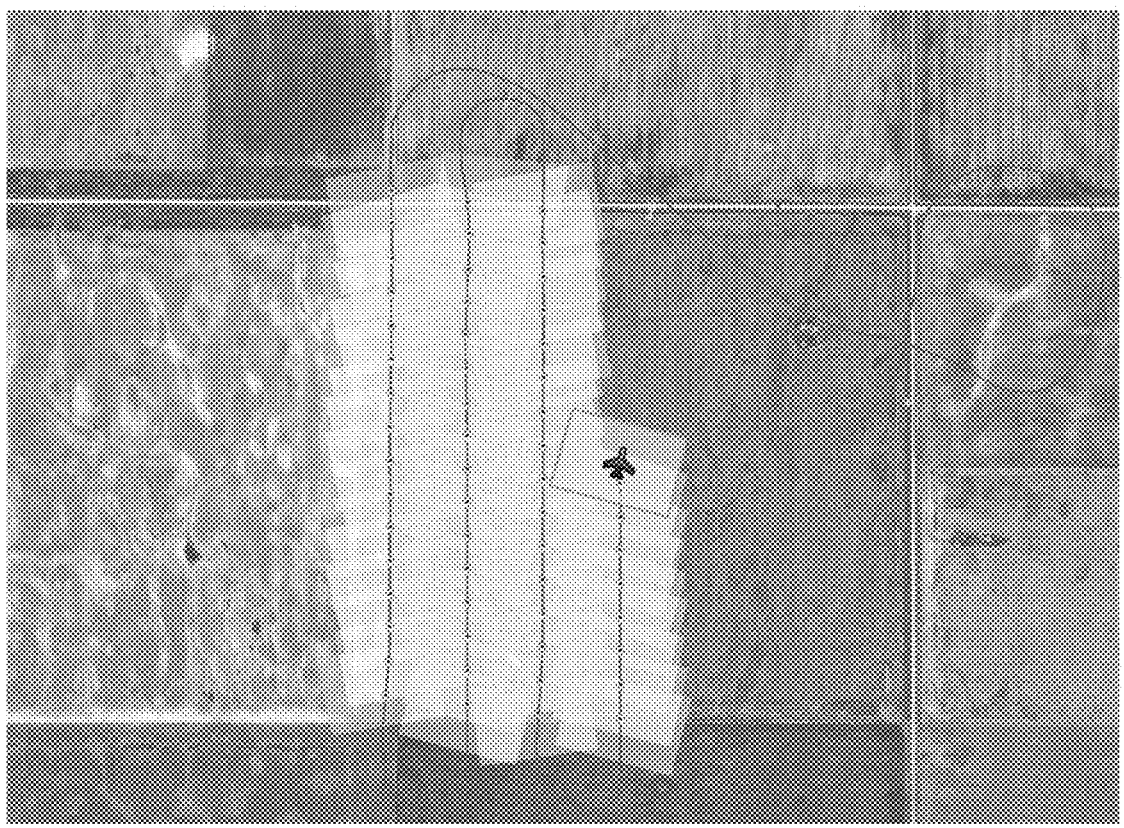
FIG. 6 is a view of one embodiment of the real-time visualization generated by the mission visualization system showing the captured image footprints, the flight line, the image capture locations, a rendering of the camera's current geographic position and attitude, and a rendering of the camera's current field of view.

In some embodiments, the mission visualization system 112 can receive and validate the image-associated geographic position data and image-associated attitude data and the captured images from the control and data management device 102 in real-time via the data transmission device 110. In one embodiment, the mission visualization system 112 can use a software program to perform direct georeferencing calculations 126 using the image-associated geographic position data and image-associated attitude data, the interior orientation parameters of the camera 104, and a DEM that are all accessible by the mission visualization system 112. The mission visualization system 112 can then display a visualization 128 of the captured image or set of captured images over a virtual representation of Earth's surface, which may include background imagery or map data, in order to allow the operator to view the georeferenced images and confirm that full coverage of the area of interest is accomplished. The visualization 128 of a captured image can take a variety of forms including, but not limited to, the captured image's footprint (a polygon representing the shape and size of the captured image on the Earth's surface), the captured image's footprint populated with the unmodified image, the captured image's footprint populated with a processed version of the image (such as a color coded Normalized Difference Vegetation Index image, an undistorted image, or a compressed image), and the projected field of view lines from the camera 104. The visualization 128 can occur in real-time throughout the mission and may be configured to show, as illustrated in FIG. 6, the flight line, image capture locations, a rendering of the camera's current geographic position and attitude, and/or a rendering of the camera's current field of view (shown in the format of an image footprint).

In some embodiments, the visualization 128 of the captured images can be limited such that only captured images that fall within the area of interest are displayed, or that only captured images within specified attitude or altitude ranges are displayed. Geographic position or attitude offsets can also be defined to account for, among other things, misalignment of the attitude measuring device 108 with respect to the camera 104 or offset of the GPS antenna 134 with respect to the camera 104.

Physical Interfacing

The disclosed system, in a preferred embodiment, is a complete camera triggering and mission visualization package designed to interface with a variety of cameras 104. The camera interface 124 is designed to minimize impact on the original form factor and functions of the camera 104. This can be accomplished with certain cameras by utilizing the hotshoe both to access the capture verification signal and as a way to rigidly attach the attitude measuring device 108 and, if desired, the positioning system 106, the control and data management device 102, and the data transmission device 110 onto the camera 104. The invention is, in a preferred embodiment, also small and lightweight so that it is suitable for use on small, unmanned aircraft as well as manned aircraft.

Real-Time Transmission of Data

In one embodiment of the invention the image-associated geographic position data and image-associated attitude data is transferred in real-time from the control and data management device 102 to the mission visualization system 112 where direct georeferencing calculations 126 and mission visualization 128 are performed. The embodiment, as illustrated in FIGS. 2-5, is an add-on for single lens reflex and mirrorless interchangeable lens cameras 104 having a hotshoe and a remote trigger input (i.e. infrared light receiver and/or a wired remote shutter port). This embodiment utilizes the VectorNav VN-200 GPS/IMU as its source of geographic position data and attitude data and an XBee 900 MHz radio frequency (RF) transceiver as its data transmission device 110.

In this embodiment, the control and data management device 102 takes the form of two circuit boards that are connected via a wire harness. One of the two boards is a primary circuit board that handles the data processing, triggering calculations, and image capture verification. The second of the two boards is a secondary circuit board, encased in a hotshoe module 202 that is attached to the camera's hotshoe, which triggers the camera 104 by flashing an infrared (IR) LED with a specific pulse code or by closing contacts using relays. The secondary circuit board also routes and translates image capture verification signals to the primary circuit board.

In this embodiment, the primary circuit board contains a microcontroller, which reads in a continuous stream of Kalman filtered geographic position and attitude data from the GPS/IMU and image capture verification signals from the secondary circuit board. When an image capture verification signal is received, the microcontroller associates the latest string in the stream of geographic position and attitude data to the latest number in an image counter. The microcontroller then outputs the image-associated geographic position and attitude data to the RF transceiver, which transfers the data to the mission visualization system 112. The microcontroller also logs the image-associated geographic position data and image-associated attitude data to a text file that is stored on a microSD card housed on the primary circuit board. The microcontroller further outputs the geographic position data and attitude data (for example, at 25 Hz) to the RF transceiver in addition to logging it to a text file stored on the microSD card. The microcontroller is additionally responsible for reading in a configuration file from the microSD card at system startup. This configuration file specifies several parameters, one of which is triggering options. The user has the option to set the embodiment to trigger at user-specified time or distance intervals, as quickly as the camera 104 is capable, or when a signal is received from an external source 122. The user can also specify trigger limits to keep the embodiment from triggering the camera 104 when it is outside of user-specified altitude, pitch, or roll bounds. The configuration file also contains information on the GPS/IMU angular orientation relative to the camera 104 as well as the GPS antenna offset. This information is relayed by the microcontroller to the positioning system 106 and attitude measuring device 108 to configure how the GPS/IMU outputs the geographic position data and attitude data.

In this embodiment, the secondary circuit board relays the trigger signal from the primary circuit board to trigger the camera 104. The secondary circuit board has an interface to which an IR LED can be connected as well as an interface to which a wired remote shutter plug can be connected. Depending on which triggering method is being used, when a trigger signal is received from the primary board, the secondary circuit board generates appropriate IR LED codes to trigger the camera 104 or closes contacts in the wired remote shutter port to focus and trigger the camera 104. The secondary board also interfaces with the hotshoe on the camera 104 to monitor the state of the contacts in the hotshoe and relay to the primary board, as image capture verification, the change in state when an image is captured.

In this embodiment, the image-associated geographic position data and image-associated attitude data, and the geographic position data and attitude data captured at a set time interval is transferred in real-time using an RF transceiver, and is received by a second RF transceiver that is connected to a desktop or laptop computer acting as the mission visualization system 112. The mission visualization system 112 uses the data, along with the interior orientation parameters of the camera 104 and a digital elevation model, to perform direct georeferencing calculations 126 and update a Keyhole Markup Language (KML) or a compressed Keyhole Markup Language (KMZ) file in real-time. The KML or KMZ file can be continuously queried so that a real-time visualization 128, as illustrated in FIG. 7, of the image footprints can be displayed in a virtual environment using Google Earth. The flight line can also be displayed, as well as the image capture locations either clamped to the ground or shown at altitude in the virtual environment.

Postponed Transmission of Data

In another embodiment of the invention, the image-associated geographic position data and image-associated attitude data, and the geographic position data and attitude data captured at a set time interval is not transferred in real-time. Rather, it is only stored on the control and data management device's 102 data storage device 116 and transferred to the mission visualization system 112 post-mission.

For example, in this embodiment, after a mission is complete, the microSD card can be removed from the control and data management device 102, and the image-associated geographic position data and image-associated attitude data, and the geographic position data and attitude data captured at a set time interval can be transferred from the microSD card to the mission visualization system 112. The captured images from the camera 104 can also be transferred to the mission visualization system 112 in that same manner. The mission visualization system 112 can then use the data from the microSD card, along with the interior orientation parameters of the camera 104 and a digital elevation model, to perform direct georeferencing calculations 126 and output a Keyhole Markup Language (KML) file or a compressed Keyhole Markup Language (KMZ) file. The KML or KMZ file can then be opened in Google Earth to view the visualization 128 in the form of the captured images, as well as the flight line and image capture locations, overlaid onto the Google Earth background imagery.

System Language

Figure 8:
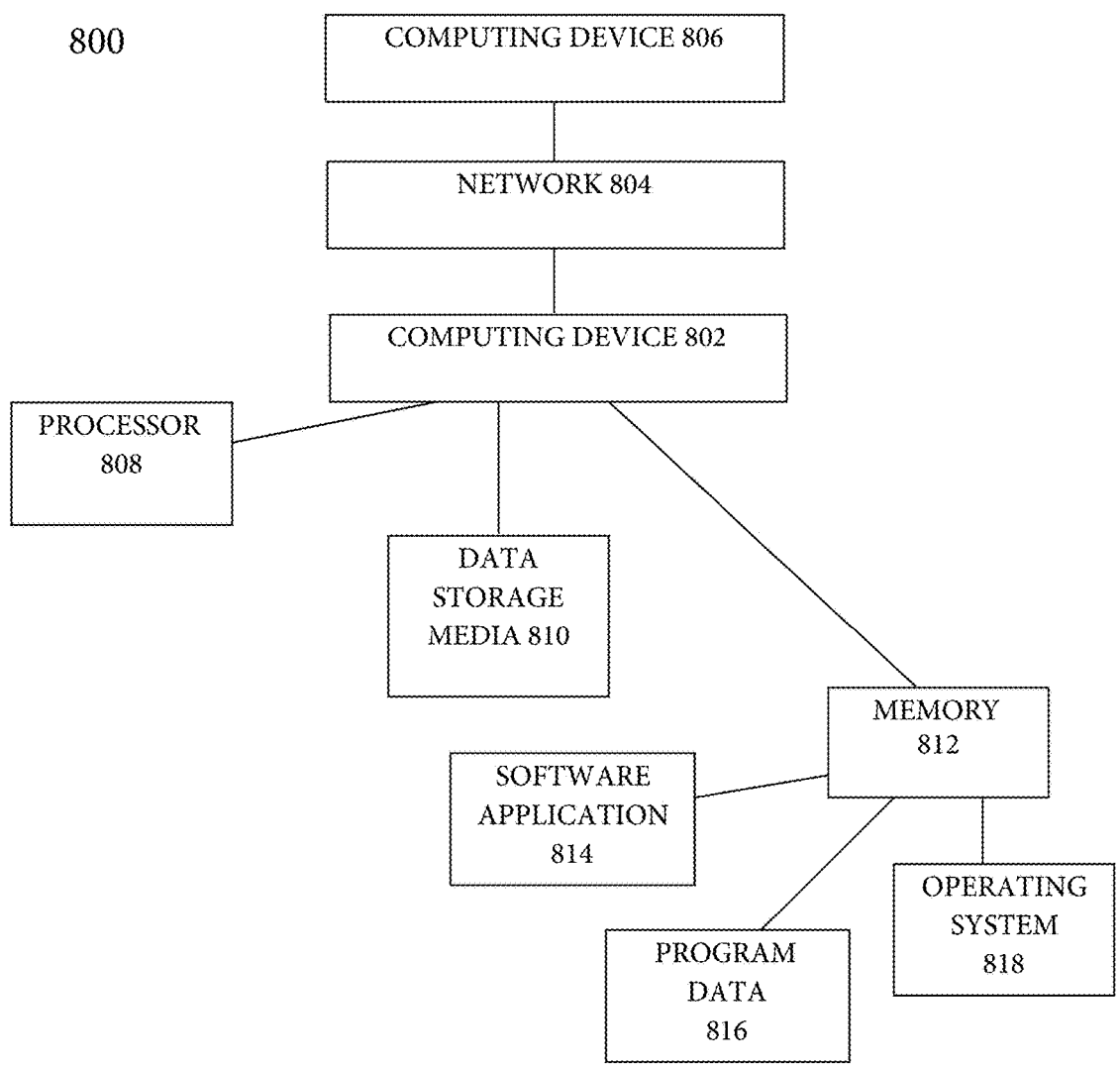
FIG. 8 is a schematic block diagram depicting an example computing system used in accordance with the mission visualization system in one embodiment of the present invention.

In some embodiments, the mission visualization system 112 described herein uses a computing system to carry out the various functions described herein. FIG. 8 is a schematic block diagram of an example computing system 800. The example computing system 800 includes at least one computing device 802. The computing device 802 can be a stand-alone computing device or a networked computing device that communicates with one or more other computing devices 806 across a network 804. The additional computing device(s) 806 can be, for example, located remotely from the first computing device 802, but configured for data communication with the first computing device 802 across a network 804.

In some examples, the computing devices 802 and 806 include at least one processor or processing unit 808 and system memory 812. The processor 808 is a device configured to process a set of instructions. In some embodiments, system memory 812 may be a component of processor 808; in other embodiments system memory 812 is separate from the processor 808. Depending on the exact configuration and type of computing device, the system memory 812 may be volatile (such as RAM), non-volatile (such as ROM, flash memory, etc.) or some combination of the two. System memory 812 typically includes an operating system 818 suitable for controlling the operation of the computing device 802, such as the WINDOWS® operating systems or the OS X operating system, or a server, such as Windows SharePoint Server, also from Microsoft Corporation, or such as a Mac Mini with OS X. The system memory 812 may also include one or more software applications 814 and may include program data 816.

The computing device 802 may have additional features or functionality. For example, the computing device 802 may also include additional data storage devices 810 (removable and/or non-removable) such as, for example, magnetic disks, optical disks, or tape. Computer storage media 810 may include volatile and nonvolatile, removable and non-removable media implemented in any method or technology for storage of information, such as computer readable instructions, data structures, program modules, or other data. System memory, removable storage, and non-removable storage are all examples of computer storage media. Computer storage media 810 includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by the computing device 802. An example of computer storage media 810 is non-transitory media.

In some examples, one or more of the computing devices 802 and 806 can be located in an establishment, such as a place of business. In other examples, the computing device 802 can be a personal computing device that is networked to allow the user to access and utilize the system disclosed herein from a remote location, such as in a user's home, office or other location. In some embodiments, the computing device 802 is a smart phone tablet, laptop computer, personal digital assistant, or other mobile device. In some embodiments, system operations and functions are stored as data instructions for a smart phone application. A network 804 facilitates communication between the computing device 802 and one or more servers, such as an additional computing device 806, that hosts the system. The network 804 may be a wide variety of different types of electronic communication networks. For example, the network 804 may be a wide-area network, such as the Internet, a local-area network, a metropolitan-area network, or another type of electronic communication network. The network 804 may include wired and/or wireless data links. A variety of communications protocols may be used in the network 804 including, but not limited to, Wi-Fi, Ethernet, Transport Control Protocol (TCP), Internet Protocol (IP), Hypertext Transfer Protocol (HTTP), Bluetooth, NFC, SOAP, remote procedure call protocols, and/or other types of communications protocols.

In some examples, the additional computing device 806 is a Web server. In this example, the first computing device 802 includes a Web browser that communicates with the Web server to request and retrieve data. The data is then displayed to the user, such as by using a Web browser software application. In some embodiments, the various operations, methods, and functions disclosed herein are implemented by instructions stored in memory. When the instructions are executed by the processor 808 of the one or more computing devices 802 or 806, the instructions cause the processor 808 to perform one or more of the operations or methods disclosed herein.

The various embodiments described above are provided by way of illustration only and should not be construed to limit the claims attached hereto. Those skilled in the art will readily recognize various modifications and changes that may be made without following the example embodiments and applications illustrated and described herein and without departing from the true spirit and scope of the following claims.

What is claimed is:

1. A camera attachment for aerial imaging mission visualization comprising:
    a first non-transitory, tangible computer-readable storage medium;
    a second non-transitory, tangible computer-readable storage medium;
    a control and data management device;
    a positioning system;
    a mission visualization system;
    an attitude measuring device interfaced with the control and data management device;
        wherein the attitude measuring device is an inertial measurement unit;
        wherein the attitude measuring device is rigidly mounted relative to the at least one camera;
    wherein the camera attachment is enabled to interface with at least one camera;
    wherein the control and data management device includes a controller, a data storage device, a camera interface, a positioning system interface, and a first software program, embodied in the first non-transitory, tangible computer-readable storage medium, that is enabled to trigger the at least one camera, collect geographic position data from the positioning system, associate the geographic position data with a captured image, and store the geographic position data and the image-associated geographic position data on the data storage device;
        wherein the first software program is further enabled to trigger the at least one camera based on at least one of a time interval, a distance interval, a waypoint arrival, an overlap interval, and a signal received from an external trigger source;
        wherein the first software program is further enabled to collect attitude data from the attitude measuring device, associate the attitude data with the captured image, and store the attitude data and the image-associated attitude data on the data storage device;
        wherein the positioning system and the attitude measuring device are enabled to combine and filter the geographic position data and the attitude data before the geographic position data and the attitude data enter the positioning system interface and the attitude measuring device interface on the control and data management device;
    wherein the mission visualization system includes a second software program, embodied in the second non-transitory, tangible computer-readable storage medium, that is enabled to perform direct georeferencing calculations for the captured image using the image-associated geographic position data and further enabled to display a visualization of the geographic position data, the image-associated geographic position data, and results from the direct georeferencing calculations on a screen;
        wherein the second software program is also enabled to perform the direct georeferencing calculations for the captured image using the image-associated attitude data, and further enabled to display a visualization of the attitude data, the image-associated attitude data, and the results from the direct georeferencing calculations on the screen;
        wherein the second software program is enabled to display a visualization of at least one of an image footprint, the captured image, or a processed image;
    wherein the camera attachment further comprises at least one of:
        a digital elevation model stored onboard the data storage device, and
        an altimeter interfaced with the control and data management device.

2. The camera attachment of claim 1, wherein the second software program is enabled to display the visualization of the geographic position data, the attitude data, the image-associated geographic position data, the image-associated attitude data, and the results from the direct georeferencing calculations on the screen in real-time throughout the mission.

3. The camera attachment of claim 1, wherein the first software program is enabled to retrieve the captured image from the at least one camera and store the captured image on the data storage device.

4. The camera attachment of claim 3, further comprising at least one data transmission device that is enabled to transfer at least one of the captured image, the geographic position data and the image-associated geographic position data from the control and data management device to the mission visualization system.

5. The camera attachment of claim 1, wherein the positioning system is a satellite-based positioning system.

6. The camera attachment of claim 1, wherein the second software program is enabled to display the visualization of at least one of the image footprint, the captured image, the processed image, or the georeferenced image in real-time throughout the mission.

7. The camera attachment of claim 1, wherein the second software program is enabled to display the visualization of the geographic position data, the image-associated geographic position data, and the results from the direct georeferencing calculations on a screen in real-time throughout the mission.

* * * * *